United States Patent Office 2,702,618
Patented Feb. 22, 1955

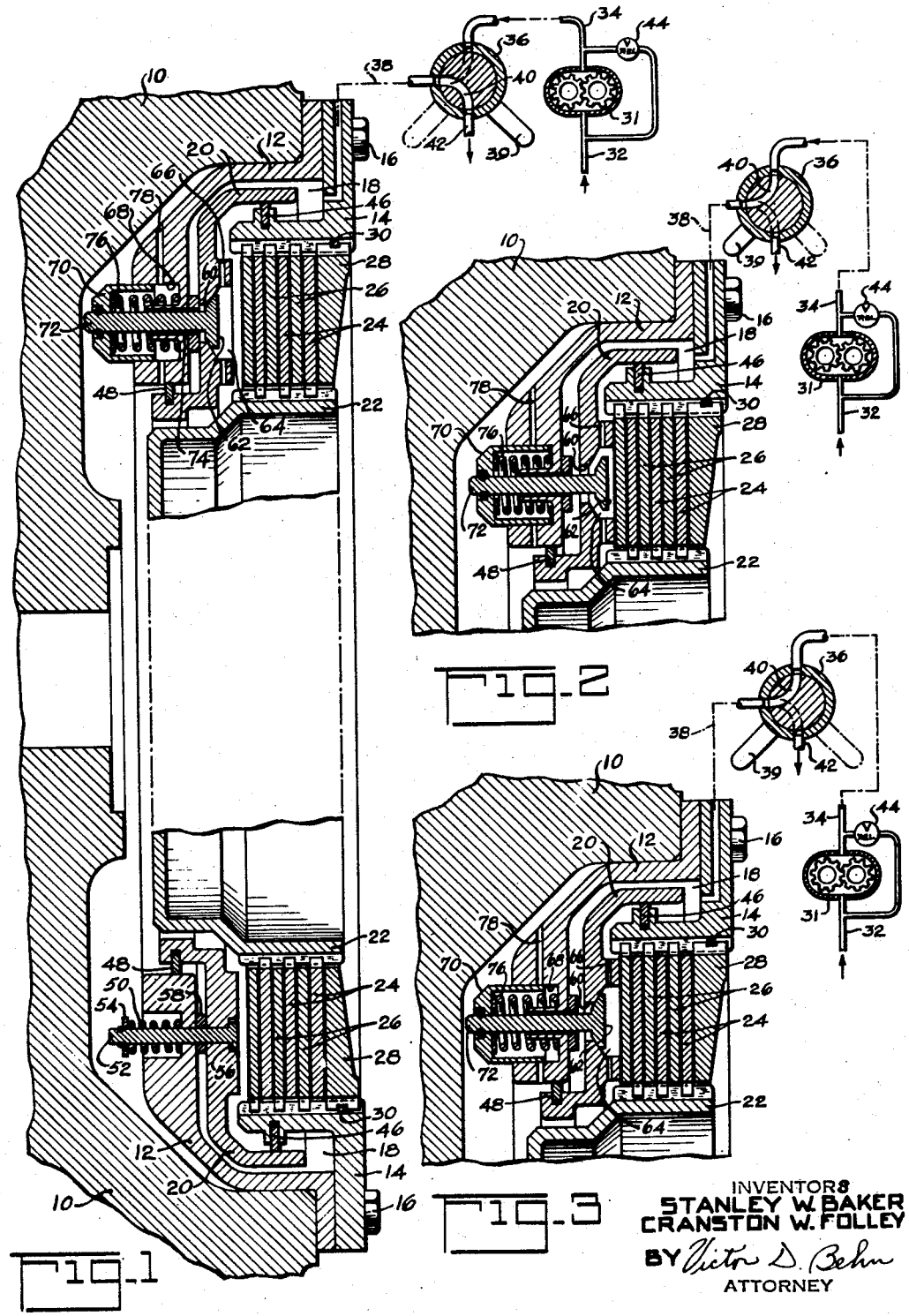

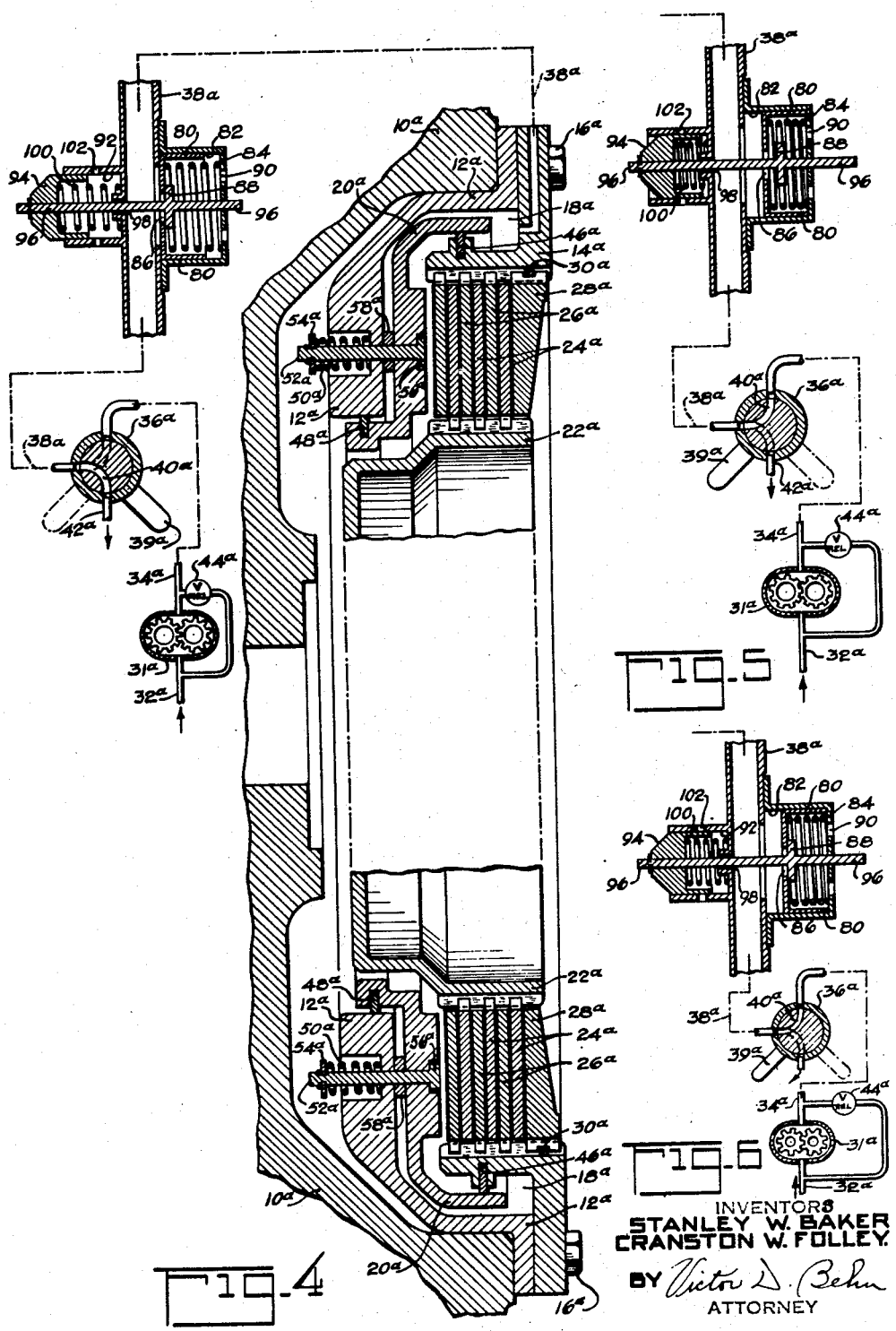

2,702,618

HYDRAULICALLY OPERATED FRICTION CLUTCH OR BRAKE WITH MULTIPLE RELIEF VALVES

Stanley W. Baker, Ramsey, and Cranston W. Folley, Ridgewood, N. J., assignors to Curtiss-Wright Corporation, a corporation of Delaware Application April 3, 1951, Serial No. 219,041

12 Claims. (Cl. 192—85)

This invention relates to hydraulically-operable frictionally-engageable clutches or brakes and is particularly directed to such a clutch or brake in which the hydraulic pressure is provided by a power operated pump and means are provided for controlling the rate of engagement of the frictionally engageable clutch or brake members. As used herein the word "power" refers to a source of mechanical power as opposed to human power.

The invention has been designed for use in connection with a brake of a two-speed drive for the supercharger of an aircraft engine in which the drive is shifted to high supercharger speed when the brake is engaged, for example as disclosed in copending application Serial No. 609,432 filed August 7, 1945, now Patent No. 2,558,738 issued July 3, 1951 and Serial No. 102,192 filed June 30, 1949 now Patent No. 2,588,462 issued March 11, 1952. In the case of such a supercharger drive, when oil or other liquid is supplied to the brake cylinder by a positive-displacement pump, the pressure in said cylinder does not increase until said cylinder is full of oil with the brake piston moved into engagement with the brake plates and then, because of the incompressibility of liquids, the next increment of oil which the pump tends to force into said cylinder causes a sudden and large increase in pressure to its maximum value whereupon the brake quickly engages. This sudden engagement of the brake may subject the supercharger drive to excessive torque particularly if, as is usually the case, the maximum brake engaging pressure is considerably in excess of that required to hold the brake against slipping during steady operation.

An object of the invention comprises the provision of a novel arrangement for retarding the rate of engagement of a hydraulically-operable frictionally-engageable clutch or brake. In accordance with the invention, a pressure below the maximum output pressure of the pump but sufficient to clamp the brake or clutch members together against relative rotation is applied to said members for a length of time sufficient to effect said clamping engagement. At the same time oil bleeds into a closed chamber until said chamber is full, the subsequent rise in pressure in said chamber being effective to close said pressure relief valve whereupon the hydraulic pressure in the system builds up to its maximum value.

Other objects of the invention will become apparent upon reading the annexed detailed description in connection with the drawing in which:

Fig. 1 is an axial sectional view illustrating a portion of a transmission having a brake embodying the invention with the brake disengaged;

Figs. 2 and 3 are views of a portion of Fig. 1 illustrating the brake in an intermediate condition and in its fully engaged condition respectively;

Fig. 4 is an axial sectional view similar to Fig. 1 but illustrating a modified form of the invention; and Figs. 5 and 6 are views of a portion of Fig. 4 illustrating the brake in an intermediate condition and in its fully engaged condition, respectively.

Referring first to Fig. 1 of the drawing, reference numeral 10 designates a fragmentary portion of a fixed housing to which an annular member 12 and an annular drum 14 are coaxially secured by screws 16 to form an annular cylindrical space 18 therebetween. An annular piston 20 is slidably fitted in the cylindrical space 18.

An annular rotatable member 22 is co-axially disposed within the drum 14. A first plurality of annular friction brake plates 24 are co-axially disposed between said drum and rotatable member, said plates being axially splined to said drum. A second plurality of annular friction brake plates 26 are co-axially disposed between said rotatable member, the plates 26 being axially splined to said rotatable member and alternating with the plates 24. A backing plate 28 is also secured to the drum 14, said backing plate being restrained against axial movement relative to said drum by a locking wire 30.

A suitable liquid, such as oil, is adapted to be supplied to the brake cylinder or cylindrical space 18 behind the piston 20 for urging said piston toward the friction brake plates 24 and 26 so as to clamp said brake plates together against the backing plate 28 whereupon the rotatable member 22 is held against rotation relative to the fixed housing 10. For this purpose, a gear pump 31 is arranged to supply oil from a passage 32 through a passage 34 to a valve 36, the outlet side of said valve communicating with the brake cylinder 18 through a passage 38. The valve 36 has a handle portion 39 movable to control a valve passage 40. When the valve 36 is open (dot and dash line position of the drawing) its passage 40 connects the brake cylinder 18 to the output side of the pump 31 for effecting engagement of the brake plates 24 and 26. When the valve 36 is closed (full-line position of drawing) its valve passage 40 connects the brake cylinder 18 to a drain passage 42 thereby effecting disengagement of the brake plates 24 and 26.

A conventional pressure relief valve 44 is connected around the pump 31 to limit its maximum output pressure. Seal rings 46 and 48 are provided to prevent leakage around the piston 20. In addition, a plurality of circumferentially-spaced springs 50 are provided for moving the piston 20 away from the friction plates 24 and 26 to insure separation of said plates when the valve 36 is moved to the position (illustrated by full-lines in the drawing) connecting the brake cylinder 18 to the drain passage 42. Each spring 50 encircles one end of a rod 52 and is disposed in compression between a washer 54 secured to said rod end and the fixed member 12. The other end of each rod 52 extends through the piston 20 and has a head portion 56 whereby the force of each spring 50 is transmitted to said piston to urge said piston away from the brake plates. A washer 58 is disposed about each rod 50 between the piston 20 and member 12 to limit the movement of the piston 20 toward the member 12.

The brake structure so far described is conventional. This structure has been designed for use in connection with a multi-speed transmission for the supercharger of an aircraft engine in which the transmission is shifted to high output speed when the brake plates 24 and 26 are clamped in engagement, the rotatable member 22 comprising a reaction member of said transmission and the pump 31 being driven by said engine. By way of example only, said transmission may be similar to any of those illustrated in said copending applications. In each said transmission, the transmission output shaft is shifted to high speed upon engagement of a brake which is equivalent to the brake structure so far described. With but the brake structure so far described, if the valve 36 were opened to admit oil to the brake cylinder 18 from the pump 31, then said cylinder would first fill up and at the same time the piston 20 would be moved against the brake plates 24 and 26. The positive displacement pump 31, however, would continue to supply oil to the brake cylinder 18 and because of its incompressible nature the next increment of oil supplied by the pump 31 would cause its output oil pressure to jump to its maximum value whereupon the brake plates 24 and 26 would be suddenly clamped together. If said brake plates are clamped together too fast, then the forces required to accelerate the supercharger to the higher speed may subject the supercharger drive transmitting parts to excessive torque. On the other hand, if the brake plates 24 and 26 should engage too slowly the slipping of the plates as they engage may generate an excessive amount of heat and cause the plates to scuff.

In general the maximum pressure applied to the frictionally engageable members of a clutch or brake is considerably in excess of that required to clamp and hold said members together against relative rotation in order to insure that there be no slipping or creeping of the brake plates under severe operating conditions or for example as a result of torsional vibrations of the engine shaft. In accordance with the present invention, means are provided for retarding the rate of engagement of the brake plates 24 and 26 by initially applying a pressure to said plates less than said maximum pressure and then after said plates have been clamped together by said lesser pressure causing said pressure to rise to its maximum value.

For this purpose the brake piston 20 is provided with pressure relief passage 60 therethrough and a valve 62 is movable to control said passage. The rear side of the piston is recessed as indicated at 64 for receiving the head of the valve 62 and for permitting opening movement of the valve when the piston 20 is in engagement with the brake plates 24 and 26. In addition one or more drain openings 66 communicate with the recess 64 to permit flow through the relief passage 60 when the brake piston 20 is in engagement with the brake plates.

A chamber 68, formed in the annular member 12 on the side of said chamber remote from the brake piston 20, is closed by a piston member 70, said piston member being connected to the valve 62 by a rod 72 passing through the member 12. A small clearance 74 is provided between the rod 72 and the member 12 to provide a restricted passageway between the brake cylinder 18 and the chamber 68. A spring 76 is disposed in the chamber 68 for urging the piston member 70 in a direction for closing the valve 62. The effective area of the piston member 70 subjected to the fluid pressure within the chamber is at least as large as the effective area of the valve 62 subjected to the pressure within the brake cylinder 18 whereby the spring 76 is effective to close said valve when said pressures are equal. The spring 76, through the head of the valve 62 urges the brake piston 20 away from the brake plates 24 and 26 along with the springs 50. The chamber 68 is also provided with one or more vent openings 78 which are open when the piston member 70 is at the extreme left end of its travel as viewed in the drawing and are arranged to be closed by said piston member upon movement of said piston member to the right.

With the aforedescribed construction, when the valve 36 is moved to its open position for admitting oil to the brake cylinder 18, said cylinder fills with oil and at the same time said oil moves the piston 20 against the brake plates 24 and 26. This requires oil under a pressure sufficient only to overcome the force of the springs 50 and 76 against the piston 20. As the pump 31 continues to supply oil, the oil pressure within the cylinder 18 will quickly rise to a value at which the relief valve 62 opens against its spring 76, said relief valve 62 being set to open at a pressure substantially lower than the pressure setting of the pump relief valve 44. For example, the valve 62 may be set to open at a pressure of 40 lbs. per square inch (p. s. i.) and the valve 44 set to open at 70 lbs. p. s. i. This movement of the brake piston 20 and valve 62 moves the piston member 70 to the right end of its travel as viewed in the drawing.

The brake is now in the condition illustrated in Fig. 2 at which the vent openings 78 of the chamber 68 are closed by the piston member 70 and the valve 62 is open to hold the pressure in the brake cylinder at an intermediate value. Oil now bleeds into the chamber 68 from the brake cylinder 18 through the restricted passageway 74. A predetermined length of time is required to fill the chamber 68 depending on the size of the chamber and on the flow restriction provided by the passageway 74. When the chamber 68 is full, pressure will build up therein to a value equal to the pressure within the brake cylinder whereupon the spring 76 is effective through the piston member 70 to move the valve 62 to close the relief passageway 60. This movement of the valve is not sufficient to cause the piston member 70 to open the vent openings 78. The brake is now in the condition illustrated in Fig. 3. Upon closure of the valve 62 the pressure in the brake cylinder 18 promptly builds up to its maximum value as set by the relief valve 44.

The magnitude of the temporary brake cylinder pressure which exists when the relief valve 62 is open, although less than the maximum brake cylinder pressure, is made sufficient to clamp the brake plates 24 and 26 together against relative rotation, the magnitude of this temporary pressure depending on the strength of the spring 76. The size of the chamber 68 and flow resistance of the path 74 are selected so that the length of time said intermediate pressure is applied is sufficient to clamp the brake plates 24 and 26 together against relative rotation. Thus said length of time can be increased by increasing the volume of said chamber and/or by increasing the flow resistance of said restricted path 74.

When the control valve 36 is moved to shut off the supply of oil pressure to the brake cylinder 18 and to connect the drain passage 42 to said cylinder, the pressure within the brake cylinder 18 immediately decreases to its minimum or zero value so that the brake promptly disengages. During said brake disengagement the relief valve 62 and chamber 68 are ineffective to cause any delay in the operation. Upon drainage of the brake cylinder 18, the springs 50 and 76 are effective to move the brake piston 20 away from the brake plates whereupon the spring 76 is effective to move the piston member 70 to the extreme left end of its travel (Fig. 1) thereby opening the vents 78 for the chamber 68. The oil within the chamber 68 thereupon drains through the vents 78 to empty said chamber.

In Figs. 1–3, a pressure relief valve is combined with the brake piston 20 and, when oil is supplied to the brake cylinder 18, the motion of said piston into contact with the brake plates closes the vent 78 for the chamber 68. Figs. 4–6 illustrate a modification in which said relief valve is disposed in the fluid pressure supply passage 38 between the valve 36 and the brake cylinder 18. In Figs. 4–6 the conventional parts of the brake have been designated by the same reference numerals used in Figs. 1–3 but with a subscript $a$ added thereto.

In Figs. 4–6, a relatively large first piston member 80 closes a portion of the passage 38a, said piston being slidable in a cylinder 82. A spring 84 urges the piston 80 to the left end of its travel, as viewed in the drawing, while the pressure within the passageway 38a urges the piston member 80 against said spring. A pressure relief passage 86 is provided through the piston 80 and a valve 88 is movable to control said passage. The cylinder 82 is provided with one or more openings 90 to permit fluid to escape therethrough when the pressure relief valve 88 is open.

A chamber 92 is provided on the side of the passage 38a remote from the cylinder 80, said chamber being closed by a second piston member 94 which is connected to the valve 88 by a rod 96 passing through the adjacent wall of the passage 38a. A small clearance 98 is provided between the rod 96 and the adjacent wall of the passage 38a to provide a restricted passageway between the passageway 38a and the chamber 92. A spring 100 is disposed in the chamber 92 for urging the piston member 94 in a direction for closing the valve 88. The effective area of the piston member 94 subjected to the fluid pressure within the chamber 92 is at least as large as the effective area of the valve 88 subjected to the pressure within the passage 38a whereby the spring 100 is effective to close said valve when said pressures are equal. The chamber 92 is also provided with one or more vent openings 102 which are open when the piston member 94 is at the extreme left end of its travel as viewed in the drawing.

With this construction of Figs. 4–6, when the valve 36a is opened to admit oil under pressure to the brake cylinder 18a, the pressure quickly rises to the point at which the relief valve 88 opens against its spring 100 and at the same time or prior thereto the piston member 80 moves to the right end of its travel as illustrated in Fig. 5 thereby moving the piston member 94 to close the vent openings 102. As in the case of the valve 62, the valve 88 opens at a pressure substantially less than the pressure setting of the pump relief valve 44a. Oil now bleeds into the chamber 92 from the passageway 38a through the restricted passageway 98, thereby filling said chamber in a length of time predetermined by the size of said chamber and the flow resistance of the restricted passageway. When the chamber 92 is full of oil, the pressure within said chamber will build up to the pressure in the passageway 38a whereupon the spring 100 is effective to close the valve 88 as in Fig. 6, the vent openings 102 remaining closed. Upon closure of the relief valve 88 the pressure within the brake cylinder 18a promptly builds up to its maximum value as set by the pump relief valve 44a. It is apparent therefore, that the operation of Figs. 4–6 is essentially the same as that of Figs. 1–3.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In a clutch or brake having frictionally engageable clutch or brake members: hydraulic mechanism for effecting engagement of said members; said mechanism comprising a cylinder; a piston slidable in said cylinder and operatively associated with said members for effecting engagement and disengagement of said members in response to movement of said piston; a power-operated positive-displacement hydraulic pump for supplying liquid to said cylinder against said piston for moving said piston to effect engagement of said members; and means operative upon the supply of liquid from said pump to said cylinder for temporarily limiting the pump output pressure to an intermediate value below the maximum available pressure from said pump; said means including a chamber, a piston slidable within said chamber, a valve connected to said chamber piston and movable in response to the supply of liquid under pressure to said cylinder to limit the pressure in said cylinder to a value below the maximum available output pressure of said pump, a restricted passageway providing communication between the pump output side and said chamber whereby the pressure in said chamber legs behind the output pressure of said pump and said chamber piston is effective in response to a predetermined pressure within said chamber for moving said valve to a position in which it is no longer effective to limit the pressure in said cylinder.

2. In a clutch or brake having frictionally engageable clutch or brake members: hydraulic mechanism for effecting engagement of said members; said mechanism comprising a cylinder; a piston slidable in said cylinder and operatively associated with said members for effecting engagement and disengagement of said members in response to movement of said piston; a power-operated positive-displacement hydraulic pump for supplying liquid to said cylinder against said piston for moving said piston to effect engagement of said members; and means operative upon the supply of liquid from said pump to said cylinder for temporarily limiting the pump output pressure to an intermediate value below the maximum available pressure from said pump; said means including a chamber, a piston slidable within said chamber, a pressure relief valve movable to an open position for relieving the output pressure of said pump in response to the supply of liquid under pressure to said cylinder, said valve being connected to said chamber piston so that the force of the fluid pressure within said chamber against its piston urges said piston in a valve closing direction, and a restricted passageway providing communication between the output side of said pump and said chamber whereby the pressure in said chamber lags behind the output pressure of said pump and said chamber piston is effective in response to a predetermined pressure within said chamber to close said valve a time interval after said valve opens.

3. In a clutch or brake having frictionally engageable clutch or brake members: hydraulic mechanism for effecting engagement of said members; said mechanism comprising a cylinder; a piston slidable in said cylinder and operatively associated with said members for effecting engagement and disengagement of said members in response to movement of said piston; a power-operated positive-displacement hydraulic pump for supplying liquid to said cylinder against said piston for moving said piston to effect engagement of said members; and means operative upon the supply of liquid from said pump to said cylinder for temporarily limiting the pump output pressure to an intermediate value below the maximum available pressure from said pump; said means including a chamber, a piston slidable within said chamber, a pressure relief valve movable to an open position for relieving the output pressure of said pump in response to the supply of liquid under pressure to said cylinder when said pressure exceeds said intermediate value, said valve being connected to said chamber piston so that the force of the fluid pressure within said chamber against its piston urges said piston in a valve closing direction, a restricted passageway providing communication between the output side of said pump and said chamber whereby the pressure in said chamber lags behind the output pressure of said pump and said chamber piston is effective to close said valve a time interval after said valve opens, and a vent passageway for said chamber, said chamber piston being movable to close said vent passageway upon the supply of liquid pressure to said cylinder by said pump.

4. In a clutch or brake having frictionally engageable clutch or brake members: hydraulic mechanism for effecting engagement of said members; said mechanism comprising a cylinder; a piston slidable in said cylinder and operatively associated with said members for effecting engagement and disengagement of said members in response to movement of said piston; a power-operated positive-displacement hydraulic pump for supplying liquid under pressure to said cylinder against said piston for moving said piston to effect engagement of said members; means including said piston and cylinder forming the walls of a space communicating with the output side of said pump whereby said space must be filled with said liquid before any substantial liquid pressure against said piston can be created by said pump, said space walls including a portion subjected to the pressure within said space and movable in response to changes in said pressure; a valve movable with said wall portion and movable with respect to said wall portion upon initiation of the supply of liquid under pressure to said space to open a pressure relief passage for said pressure; a chamber; a piston slidable within said chamber and connected to said valve so that the fluid pressure within said chamber urges its piston in a valve closing direction; a restricted passageway providing communication between said chamber and said space whereby the pressure in said chamber lags behind the pressure in said space and said chamber piston is effective in response to a predetermined pressure within said chamber to close said valve an interval after said valve opens; and a vent passageway for said chamber, said chamber piston being movable in response to movement of said wall portion to close said vent passageway upon the supply of liquid under pressure to said space.

5. In a clutch or brake having frictionally engageable clutch or brake members: hydraulic mechanism for effecting engagement of said members; said mechanism comprising a cylinder; a piston slidable in said cylinder and operatively associated with said members for effecting engagement and disengagement of said members in response to movement of said piston; a power-operated positive-displacement hydraulic pump for supplying liquid under pressure to said cylinder against said piston for moving said piston to effect engagement of said members; means including said piston and cylinder forming the walls of a space communicating with the output side of said pump whereby said space must be filled with said liquid before any substantial liquid pressure against said piston can be created by said pump, said space walls including a portion subjected to the pressure within said space and movable in response to changes in said pressure; a valve subjected to and urged in an opening direction by pressure in said space, said valve being movable with said wall portion and movable with respect to said wall portion upon initiation of the supply of liquid under pressure to said space to open a pressure relief passage for said pressure; spring means opposing movement of said valve and wall portion in response to increase of pressure within said space; a chamber, a piston slidable within said chamber and connected to said valve so that the fluid pressure within said chamber urges its piston in a valve closing direction; a restricted passageway providing communication between said chamber and said space whereby the pressure within said chamber lags behind the pressure within said space and said chamber piston is effective in response to a predetermined pressure within said chamber to close said valve an interval after said valve opens; and a vent passageway for said chamber, said chamber piston being movable in response to movement of said wall portion to close said vent passageway upon the supply of liquid under pressure to said space.

6. In a clutch or brake having frictionally engageable clutch or brake members: hydraulic mechanism for effecting engagement of said members; said mechanism comprising a cylinder; a piston slidable in said cylinder and operatively associated with said members for effecting engagement and disengagement of said members in response to movement of said piston; a power-operated positive-displacement hydraulic pump for supplying liquid under pressure to said cylinder against said piston for moving said piston to effect engagement of said members; means including said piston and cylinder forming the walls of a space communicating with the output side of said pump whereby said space must be filled with said liquid before any substantial liquid pressure against said piston can be created by said pump, said space walls including a portion subjected to the pressure within said space and movable in response to changes in said pressure; a spring opposing movement of said wall portion in response to pressure increase in said space; a valve movable with said wall portion and movable with respect to said wall portion upon initiation of the supply of liquid under pressure to said space to open a pressure relief passage for said pressure; a spring opposing said valve opening movement; a chamber; a piston slidable within said chamber and connected to said valve so that the fluid pressure within said chamber urges its piston in a valve closing direction; a restricted passageway providing communication between said chamber and said space whereby the pressure within said chamber lags behind the pressure within said space and said chamber piston is effective in response to a predetermined pressure within said chamber to close said valve an interval after said valve opens; and a vent passageway for said chamber, said chamber piston being movable in response to movement of said wall portion to close said vent passageway upon the supply of liquid under pressure to said space.

7. In a clutch or brake having frictionally engageable clutch or brake members: hydraulic mechanism for effecting engagement of said members; said mechanism comprising a cylinder; a piston slidable in said cylinder and operatively associated with said members for effecting engagement and disengagement of said members in response to movement of said piston; a power-operated positive-displacement hydraulic pump; a passageway connecting the output side of said pump to said cylinder for supplying liquid under pressure to said cylinder for moving said piston to effect engagement of said members; a member subjected to the pressure within said supply passageway and movable in response to changes in said pressure; a valve movable with said movable member and with respect to said member upon initiation of the supply of liquid under pressure to said supply passageway to open a pressure relief passage for said pressure; a chamber; a piston slidable within said chamber and connected to said valve so that the fluid pressure within said chamber urges its piston in a valve closing direction; a restricted passageway providing communication between said chamber and said supply passageway whereby the pressure within said chamber lags behind the pressure within said supply passageway and said chamber piston is effective in response to a predetermined pressure within said chamber to close valve a time interval after said valve opens; and a vent passageway for said chamber, said chamber piston being movable in response to movement of said member to close said vent passageway upon the supply of liquid under pressure to said supply passageway and cylinder.

8. In a clutch or brake having frictionally engageable clutch or brake members: hydraulic mechanism for effecting engagement of said members; said mechanism comprising a cylinder; a piston slidable in said cylinder and operatively associated with said members for effecting engagement and disengagement of said members in response to movement of said piston; a power-operated positive-displacement hydraulic pump; a passageway connecting the output side of said pump to said cylinder for supplying liquid under pressure to said cylinder for moving said piston to effect engagement of said members, a member subjected to the pressure within said supply passageway and movable in response to changes in said pressure; a valve subjected to and urged in an opening direction by pressure in said supply passageway, said valve being movable with said movable member and with respect to said member upon initiation of the supply of liquid under pressure to said supply passageway to open a pressure relief passage for said pressure; spring means opposing movement of said valve and movable member in response to pressure increase in said supply passageway; a chamber; a piston slidable within said chamber and connected to said valve so that the fluid pressure within said chamber urges its piston in a valve closing direction; a restricted passageway providing communication between said chamber and said supply passageway whereby the pressure within said chamber lags behind the pressure within said supply passageway and said chamber piston is effective in response to a predetermined pressure within said chamber to close said valve a time interval after said valve opens; and a vent passageway for said chamber, said chamber piston being movable in response to movement of said member to close said vent passageway upon the supply of liquid under pressure to said supply passageway and cylinder.

9. In a clutch or brake having frictionally engageable clutch or brake members: hydraulic mechanism for effecting engagement of said members; said mechanism comprising a cylinder; a piston slidable in said cylinder and operatively associated with said members for effecting engagement and disengagement of said members in response to movement of said piston; a power-operated positive-displacement hydraulic pump for supplying liquid to said cylinder against said piston for moving said piston to effect engagement of said members; a valve movable with said piston and movable with respect to said piston upon initiation of the supply of liquid under pressure to said cylinder to open a pressure relief passage through said piston for said cylinder; a chamber; a piston slidable within said chamber and connected to said valve so that the fluid pressure within said chamber urges its piston in a valve closing direction; a restricted passageway providing communication between said chamber and cylinder whereby the pressure within said chamber lags behind the pressure within said cylinder and said chamber piston is effective in response to a predetermined pressure within said chamber to close said valve a time interval after said valve opens; and a vent passageway for said chamber, said chamber piston being movable in response to movement of said cylinder piston to close said vent passageway upon the supply of liquid under pressure to said cylinder.

10. In a clutch or brake having frictionally engageable clutch or brake members: hydraulic mechanism for effecting engagement of said members; said mechanism comprising a cylinder; a piston slidable in said cylinder and operatively associated with said members for effecting engagement and disengagement of said members in response to movement of said piston; a power-operated positive-displacement hydraulic pump for supplying liquid to said cylinder against said piston for moving said piston to effect engagement of said members; a valve subjected to and urged in an opening direction by the pressure in said cylinder, said valve being movable with said piston and with respect to said piston upon initiation of the supply of liquid under pressure to said cylinder to open a pressure relief passage through said piston for said cylinder; spring means opposing movement of said valve and piston in response to pressure increase in said cylinder; a chamber; a piston slidable with said chamber and connected to said valve so that the fluid pressure within said chamber urges its piston in a valve closing direction; a restricted passageway providing communication between said chamber and cylinder whereby the pressure within said chamber lags behind the pressure within said cylinder and said chamber piston is effective in response to a predetermined pressure within said chamber to close said valve a time interval after said valve opens; and a vent passageway for said chamber, said chamber piston being movable in response to movement of said cylinder piston to close said vent passageway upon the supply of liquid under pressure to said cylinder.

11. In a clutch or brake having frictionally engageable clutch or brake members: hydraulic mechanism for effecting engagement of said members; and mechanism comprising a cylinder; a piston slidable in said cylinder and operatively associated with said members for effecting engagement and disengagement of said members in response to movement of said piston; a power-operated positive displacement hydraulic pump for supplying liquid to said cylinder against said piston for moving said piston to effect engagement of said members; a pressure relief valve for limiting the maximum available pressure from said pump; and means operative upon the supply of liquid from said pump to said cylinder for temporarily limiting the pump output pressure to an intermediate value below said maximum value; said means including a movable valve member having a first position in which it limits the liquid pressure transmitted to said cylinder by said pump to said intermediate value and having a second position in which said valve member is inoperative to so limit the cylinder pressure, elastic means urging said valve member toward its said second position, said valve member having a portion subject to the pressure of the liquid supplied to said cylinder for moving said valve member to its said first position against said elastic means when the pressure of liquid supplied to said cylinder exceeds said intermediate value, and means including said elastic means automatically operative a predetermined time interval after said valve member movement to its said first position for moving said valve member to its said second position.

12. In a clutch or brake having frictionally engageable clutch or brake members: hydraulic mechanism for effecting engagement of said members; said mechanism comprising a cylinder; a piston slidable in said cylinder and operatively associated with said members for effecting engagement and disengagement of said members in response to movement of said piston; a power operated positive displacement hydraulic pump for supplying liquid to said cylinder against said piston for moving said piston to effect engagement of said members; a pressure relief valve for limiting the maximum available pressure from said pump; and means operative upon the supply of liquid from said pump to said cylinder for temporarily limiting the pump output pressure to an intermediate value below said maximum value; said means including a second pressure relief valve for the output pressure of said pump, spring means urging said second valve toward its closed position and said second valve having a portion subject to the pressure of the liquid supplied to said cylinder for moving said second valve to its open position against said spring means when said liquid pressure exceeds an intermediate pressure less than said maximum pressure, and means including said spring means automatically operative a predetermined time interval after said second valve opens for closing said second valve.

References Cited in the file of this patent

UNITED STATES PATENTS

| | | |
|---|---|---|
| 1,758,370 | Olsen et al. | May 13, 1930 |
| 2,100,810 | Livermore | Nov. 30, 1937 |
| 2,170,538 | Sarver | Aug. 22, 1939 |
| 2,386,220 | Lawler et al. | Oct. 9, 1945 |
| 2,556,809 | Hobbs | June 12, 1951 |
| 2,577,981 | Stacy | Dec. 11, 1951 |

FOREIGN PATENTS

| | | |
|---|---|---|
| 370,848 | Italy | May 3, 1939 |
| 524,702 | Great Britain | Aug. 13, 1940 |
| 586,385 | Great Britain | Mar. 17, 1947 |
| 636,240 | France | Apr. 4, 1928 |
| 784,051 | France | July 22, 1935 |